United States Patent
Quinn

[15] 3,651,351
[45] Mar. 21, 1972

[54] RAPIDLY ACTING CONDITION RESPONSIVE SWITCH

[72] Inventor: Frederic R. Quinn, Red Hook, N.Y.
[73] Assignee: Zyrotron Industries, Inc., South Hackensack, N.J.
[22] Filed: Dec. 24, 1969
[21] Appl. No.: 888,084

Related U.S. Application Data

[63] Continuation-in-part of Ser. No. 584,602, Oct. 5, 1966, abandoned.

[52] U.S. Cl............................307/310, 219/494, 219/499, 219/501, 307/252 T, 328/3
[51] Int. Cl. .........................................................H03k 17/00
[58] Field of Search ................................328/1–5, 81; 307/252 T, 310; 315/196, 251; 219/494, 499, 501, 510, 511; 323/75 H, 75 N

[56] References Cited

UNITED STATES PATENTS

| | | | |
|---|---|---|---|
| 3,159,737 | 12/1964 | Dora | 328/3 X |
| 3,302,031 | 1/1967 | Gutzwiller | 307/296 X |
| 3,175,077 | 3/1965 | Fox et al. | 219/501 X |
| 3,327,096 | 6/1967 | Bernous | 219/501 |
| 3,375,347 | 3/1968 | Seney | 219/501 X |

*Primary Examiner*—John Zazworsky
*Attorney*—Irving Seidman

[57] ABSTRACT

A rapidly acting condition responsive switch for selectively connecting an input circuit with an output circuit which includes a pair of silicon controlled rectifiers connected in inverse parallel relationship between the input and output circuits wherein respective diodes are connected in series with each of the silicon controlled rectifiers to prevent leakage currents from flowing therethrough. Control means is provided to produce gate signals to render the rectifiers conductive. Lead means is adapted to connect an energizing source to the control means. A thermal sensing device which is operable to rapidly change from a high impedance state to a low impedance state at a preselected temperature is provided and is connected with the energizing source and the control means. A heater is in heat exchanging relationship with the thermal sensing device and is responsive to a predetermined condition to heat the thermal sensing device to the preselected temperature whereby the impedance of the thermal sensing device drops rapidly to the low impedance state to provide for the flow of current through the control means.

3 Claims, 3 Drawing Figures

PATENTED MAR 21 1972 3,651,351

INVENTOR
FREDERIC R. QUINN
BY
*Irving Seidman*
ATTORNEY.

RAPIDLY ACTING CONDITION RESPONSIVE SWITCH

This application is a continuation-in-part application of my copending application Ser. No. 584,602, filed Oct. 5, 1966, now abandoned entitle Condition Responsive Switch and assigned to the assignees of the present invention.

This invention relates generally to a rapidly acting condition responsive switch and, more particularly, pertains to an electronic switch which is operable to rapidly connect an input circuit with an output circuit in response to the occurrence of a predetermined condition.

Presently, condition responsive switches are utilized to automatically connect an input circuit with an output circuit when a predetermined condition is found to exist. For example, such switches have been used to sense the fluid level in a storage tank and to actuate a pump to supply more fluid to the tank when the fluid falls below a preselected level. However, these switches are usually mechanical in construction and they suffer from a great number of drawbacks. As an illustration of such disadvantages, it has been found that these switches are cumbersome to handle and difficult to install and, after a short period of continuous use, they become unreliable in operation. Additionally, the moving elements which comprise the switch are subjected to continuous wear as the contacts of the switch open and close thereby necessitating frequent replacement of the switch. A further disadvantage associated with switches of this general type is their relatively high initial cost and their high cost of operation. Moreover, it is a desirable feature to have such switches operate in a minimum interval of time after the condition has been sensed to exist, particularly if the condition relates to safety.

Accordingly, the desideratum of the present invention is to provide an electronic switch which is operable in response to the occurrence of a predetermined condition to connect a source of potential with a load to energize the load.

Another object of the present invention is to provide a highly reliable condition responsive switch which is economical to manufacture and easy to maintain.

A further object of the invention resides in the novel details of circuitry which provide a condition responsive switch which operates rapidly after the predetermined condition has been found to exist.

Accordingly, a rapidly acting condition responsive switch constructed in accordance with the present invention is utilized for selectively connecting an input circuit with an output circuit and comprises switch means including a pair of silicon controlled rectifiers connected in inverse parallel relationship between the input and output circuits. A respective diode is connected in series with each of the silicon controlled rectifiers and each diode is polarized to conduct current in the same direction as the associated serially connected silicon controlled rectifier for preventing leakage currents from flowing therethrough. Each of the silicon controlled rectifiers has a respective anode, a cathode and a gate electrode and control means is connected to the gate electrodes for producing a control signal in response to the flow of current therethrough to cause said pair of silicon controlled rectifiers to conduct. Lead means connects an energizing source to the control means. A thermal sensing device which is operable to rapidly change from a high impedance state to a low impedance state at a preselected temperature is provided. Circuit means connects the thermal sensing device with the energizing source and the control means. A heater is provided which is in heat exchanging relationship with said thermal sensing device and is responsive to a predetermined condition to heat the thermal sensing device to the preselected temperature whereby the impedance of said thermal sensing device drops rapidly to said low impedance state to provide for the flow of current through the control means to produce said control signal to connect the input circuit with said output circuit.

Other features and advantages of the present invention will become more apparent from a consideration of the following detailed description when taken in conjunction with the accompanying drawings, in which.

Figure 1:
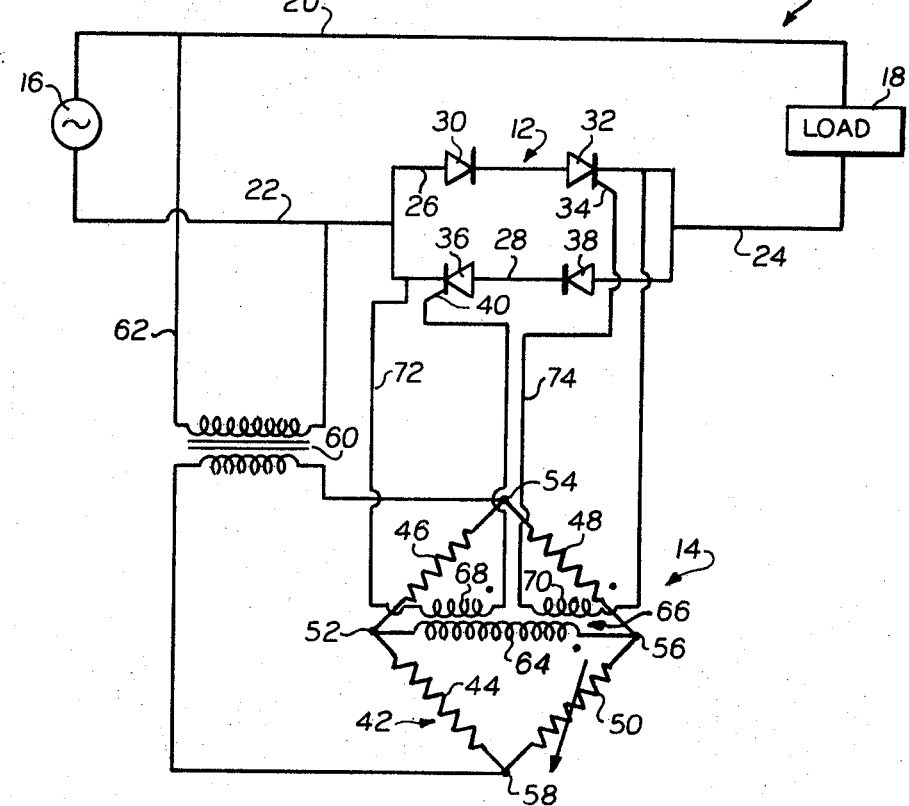
FIG. 1 is a schematic circuit wiring diagram of a condition responsive switch constructed in accordance with the present invention.

A condition responsive switch constructed according to the present invention is illustrated in FIG. 1 and is designated generally by the reference numeral 10. The switch 10 comprises a switch portion, designated generally by the reference numeral 12, and a control circuit, designated generally by the reference numeral 14, which is adapted to control the operation of the switch 12. The switch portion 12, as shown in FIG. 1, is adapted to connect an alternating current source of potential 16 with a load 18 or to disconnect it therefrom, as the case may be. However, this particular use of the switch 10 is for illustrative purposes only as the condition responsive switch 10 may be utilized to control the connection between any type or types of input and output circuits.

More particularly, one terminal of the source of potential 16 is connected to one terminal of the load 18 by a lead 20. The other terminal of the source 16 is connected to the input end of the switch portion 12 by a lead 22. The output end of the switch portion 12 is connected to the unconnected terminal of the load 18 by a lead 24.

The switch portion 12 comprises an upper conducting path 26 and a lower conducting path 28. Serially connected together between the leads 22 and 24 in the upper path 26 is a diode 30 and a silicon controlled rectifier or SCR 32. As is well known in the art, the SCR is provided with an anode, cathode and a gate electrode 34 and it is operable to conduct a current from the anode to the cathode electrodes when the potential difference between the gate electrode 34 and the cathode electrode of the SCR exceeds a critical or firing value and the SCR is properly biased. Thus, the diode 30 and the SCR 32 are polarized so that they will conduct a current when the signal on the lead 22 is positive with respect to the signal on the lead 24 and the SCR 32 has been rendered conductive.

The lower path 28 includes an SCR 36 and a diode 38 serially connected together between the leads 22 and 24. The SCR 36 includes a gate electrode 40. The diode 38 and the SCR 36 are polarized so that they will conduct a current when the signal on the lead 22 is negative with respect to the signal on the lead 24 and the SCR 36 has been rendered conductive.

It will now be obvious that the source 16 will be applied across the load 18 when the SCR's 32 and 36 have been fired by control signals applied between their respective gate electrodes and cathode electrodes. However, the source 16 will be disconnected from the load 18 when the SCR's 32 and 36 are in their high impedance or nonconducting state. Moreover, it is to be noted that the anode of the diode 30 is connected to the lead 22 and the anode of the diode 38 is connected to the lead 24. The diodes 38 and 30 prevent leakage currents from flowing through their respective paths. The conduction of the SCR's 32 and 36 and, therefore, the operation of the switch 10 is controlled by the control circuit 14.

The control circuit 14 includes a four-arm bridge 42. Received in the respective arms of the bridge 42 is a different impedance respectively designated 44, 46, 48 and 50. In practice, the impedances 44—48 are fixed resistors. However, this example is for illustrative purposes only since the impedances 44—48 may be reactances as well as resistors.

The impedances 44 and 46 are connected together to provide a junction 52; the impedances 46 and 48 are connected together at a junction 54; the impedances 48 and 50 are connected together to provide a junction 56; and, the impedances 50 and 44 are connected together at a junction 58. The junctions 52 and 56 define the terminal points of one diagonal of the bridge 42 and the junctions 54 and 58 define the terminal points of the other diagonal of the bridge.

Connected between the junctions 54 and 58 is an energizing source in the form of the secondary winding of a transformer 60. The primary winding of the transformer 60 is connected across the source 16 by a lead 62.

Connected between the junctions 52 and 56 of the bridge 42 is the primary winding 64 of a pulse transformer 66 having two secondary windings 68 and 70. A lead 72 connects the secondary winding 68 between the gate electrode 40 and the cathode electrode of the SCR 36. Likewise, a lead 74 connects the secondary winding 70 between the gate electrode 34 and the cathode electrode of the SCR 32.

As noted above, a feature of the present invention resides in the rapid action of the switch. Accordingly, in practice, the variable resistor 50 comprises a thermal sensing device as shown and described in my copending application Ser. No. 877,379, filed on Nov. 17, 1969, entitled Thermal Sensing Device. As shown therein, the sensing device is temperature sensitive and has a relatively high impedance or resistance below approximately 180° C. However, when the ambient temperature reaches approximately 180° C, the resistance of the impedance 50 drops sharply to a relatively low value. Moreover, this drop in impedance or resistance occurs rapidly so that effectively the resistance of the impedance 50 may be thought of as having a high impedance and a low impedance state. This is to be contradistinguished from other thermistor-type sensors wherein the change in impedance is gradual.

The operation of the switch portion 12 is dependent upon the value of the variable impedance 50 with respect to the impedances 44–48 in the other arms of the four-arm bridge 42. Thus, when the value of the impedance 50 causes the bridge 42 to be balanced (i.e., when the junctions 52 and 56 are at the same potential), no current will flow through the primary winding 64 of the pulse transformer 66. Thus, there will be no current flow in the secondary circuits and the switch portion 12 will remain open or in the high impedance state.

On the other hand, if the value of the impedance 50 causes the bridge 42 to be unbalanced so that there is a potential difference between the junctions 52 and 56, a current will flow through the primary winding 64 of the transformer 66 thereby to produce output signals across the secondary windings 68 and 70. The windings of the transformer 66 are connected so that the SCR 32 will be fired when a positive signal appears on the lead 22 and the SCR 36 will be fired when a negative signal appears on the lead 22.

The impedance 50 may be used to monitor the condition of any parameter which can be converted into a temperature variation and may be responsive to the occurrence of a preselected condition to either balance or unbalance the bridge 42 in accordance with the particular environment of the switch 10. As an illustrative example, it is assumed that the switch 10 will be utilized to monitor the level of water in a storage chamber or a reservoir. For this particular application, the load 18 may be a water pump which is adapted to be energized when the level of water falls below a preselected mark thereby to pump additional water into the reservoir. The value of the impedance 50 is controlled by a probe of conventional design and commercially available on the market which may vary the current through a heater associated with the impedance or thermal sensing device. In this case, the heater (not shown) would be connected to circuitry external to the switch circuits.

When the water is above the preselected level, the probe will maintain impedance 50 at a value which causes the bridge 42 to be balanced. Hence, the SCR's 32 and 36 will remain nonconducting and the pump will remain deenergized.

However, when the water falls below the preselected level, the probe will cause the value of the impedance 50 to change to a value which causes the bridge 42 to be unbalanced. Accordingly, a current will flow through the diagonal containing the primary winding 64 of the transformer 66 to produce output signals in the secondary circuits. Thus, the SCR's 32 and 36 will be fired thereby to close the switch portion 12 to connect the source 16 with the load 18. Hence, the pump will be energized to pump additional water into the reservoir.

While the example set forth above is limited to an impedance which changes from a bridge-balanced to a bridge-unbalanced value in response to changes in the level of water, it is emphasized that the impedance 50 may be responsive to any condition which is convertable into a temperature change to remotely control the operation of an associated device.

Figure 2:
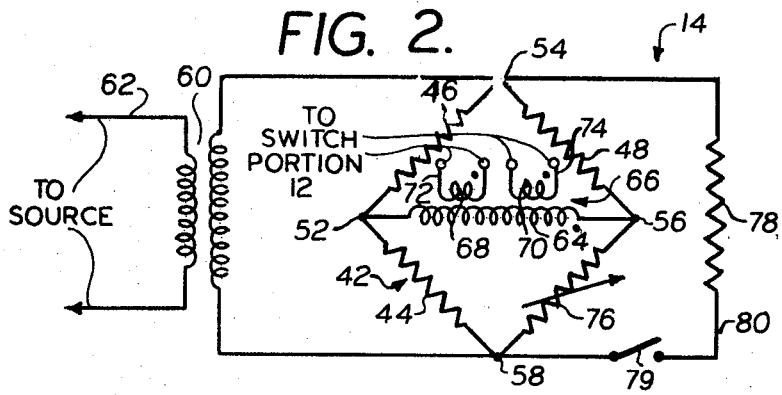
FIG. 2 is a schematic circuit wiring diagram of the control circuit of the switch shown in FIG. 1, illustrating the use of a heater in cooperation with the condition responsive element.

FIG. 2 illustrates, as another example, a control circuit 14 of a switch 10 which is responsive to changes in temperature to operate an associated device and which incorporates an associated heater. It is to be understood that the control circuit of FIG. 2 is connected with a switch portion identical to the switch portion 12 shown in FIG. 1. Hence, similar numbers in the figs. indicate identical elements. Thus, in the control circuit of FIG. 2, a heater 78 for the thermal sensing device or variable impedance 50 is connected with the secondary winding of the transformer 60 through a single-pole single-throw switch 79 by a lead 80.

In operation, the initial high resistance of the thermal sensing device 50 causes the bridge 42 to be unbalanced so that a current flows through the primary winding 64 of the transformer 66. Thus, the SCR's 32 and 36 of the switch portion (not shown) connected with the control circuit shown in FIG. 2 will be driven into conduction. Accordingly, the load will be energized.

When it is desired to disconnect the load from the source, the switch 79 is closed thereby connecting the heater 78 with the winding of the transformer 60 to energize the same. As the ambient temperature increases, the resistance of the device or variable impedance decreases until the bridge 42 is balanced. Accordingly, current will cease to flow through the primary winding 64 of the transformer 66 thereby to remove the firing potential from the SCR's. Hence, the SCR's 32 and 36 will stop conducting to effectively disconnect the load from the source 16.

Accordingly, a rapidly acting condition responsive switch has been provided which may be utilized to either connect an input circuit with an output circuit or to disconnect the same therefrom upon the occurrence of a predetermined condition, which is simple in construction and economical to manufacture.

Figure 3:
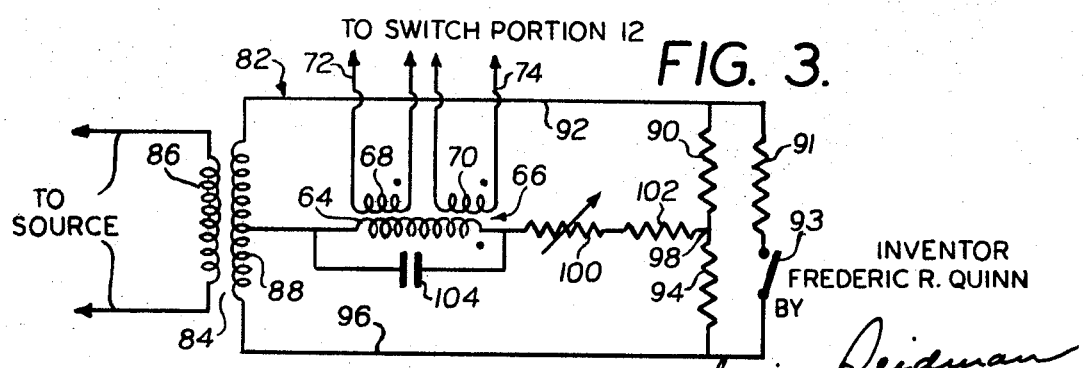
FIG. 3 is a schematic circuit wiring diagram of a modified embodiment of the control circuit of a condition responsive switch.

FIG. 3 illustrates a modified embodiment of a control circuit of a condition responsive switch which is designated generally by the reference numeral 82 and which is adapted to be used with a switch portion 12. The control circuit 82 utilizes a thermal sensing device 100 of the type disclosed in the aforementioned application as the condition responsive element similarly to the control circuit 14 of FIG. 2. However, unlike the circuit of FIG. 2, the control circuit of FIG. 3 is adapted to render the SCR's of the associated switch portion conductive when the resistance of the thermistor has decreased in response to an increased ambient temperature.

More specifically, the control circuit 82 includes a transformer 84 having a primary winding 86 connected to a source of potential such as the source 16 in FIG. 1, and a center-tapped secondary winding 88. One end of the secondary winding 88 is connected to one end of a resistor 90 and a heater 91 by a lead 92. The other end of the secondary winding 88 is connected to one end of a resistor 94 and the heater 91, through a single-pole single-throw switch 93, by a lead 96. The other ends of the resistors 90 and 94 are connected together by a lead 98. The resistors 90 and 94 are unequal in value.

Connected between the center-tap on the secondary winding 88 and the lead 98 is a series circuit comprising the primary winding 64 of the pulse transformer 66, the device 100 and a current limiting resistor 102. A bypass capacitor 104 is connected in parallel with the primary winding 64. The secondary windings 68 and 70 are connected to the SCR's of the associated switch portion, in the same manner as indicated in FIG. 1, by the respective leads 72 and 74.

In operation, the initial resistance of the thermal sensing device 100 is relatively high so that the current flowing through the series connected primary winding 64 of the transformer 66 is negligible. Thus, the associated SCR's will remain nonconducting However, when the switch 93 is closed, the ambient temperature of the device 100 rises due to the energized heater 91, and the resistance of the device 100 decreases when the critical temperature is reached. Hence, the current through the primary winding 64 will increase until the secondary currents reach a level sufficient to fire the associated silicon controlled rectifiers. Consequently, the source will be connected with the load to energize the load through the switch portion of the switch 10.

While preferred embodiments of the invention have been shown and described herein, it will be obvious that numerous omissions, changes and additions may be made in such embodiments without departing from the spirit and scope of the present invention.

What is claimed is:

1. A rapidly acting condition responsive switch for selectively connecting an input circuit with an output circuit comprising switch means including a pair of silicon controlled rectifiers connected in inverse parallel relationship between the input and output circuits; a respective diode connected in series with each of said silicon controlled rectifiers and each being polarized to conduct current in the same direction as the serially connected silicon controlled rectifier for preventing leakage currents from flowing therethrough; each of said silicon controlled rectifiers having a respective anode, a cathode and a gate electrode; control means connected to said gate electrodes for producing a control signal in response to the flow of current therethrough to cause said pair of silicon controlled rectifiers to conduct; lead means for connecting an energizing source to said control means; a thermal sensing device operable to rapidly change from a high impedance state to a low impedance state at a preselected temperature, circuit means for connecting said thermal sensing device with the energizing source and said control means; and a heater in direct heat exchanging relationship with said thermal sensing device and being responsive to a predetermined condition to heat said thermal sensing device to said preselected temperature whereby the impedance of said thermal sensing device drops rapidly to said low impedance state to provide for the flow of current through said control means to produce said control signal to connect said input circuit with said output circuit.

2. A switch as in claim 1, in which said lead means includes a center-tapped winding of a transformer, said circuit means including a pair of resistors serially connected together at a junction and between the ends of said winding, and means for connecting said control means in series with said thermal sensing device between the center-tap of said winding and said junction; and means for connecting said heater in parallel with said pair of resistors.

3. A switch as in claim 1, in which said circuit means comprises three resistors connected with said thermal sensing device to form a bridge circuit having four arms and two diagonals, said lead means connecting the energizing source across one of said diagonals, means for connecting said control means across the other of said diagonals, said thermal sensing device being adapted to balance said bridge when the impedance thereof is high and to unbalance said bridge when the impedance thereof is low, a switch in series with said heater, and means for connecting said series circuit of said heater and said switch across said one diagonal.

* * * * *